US011460826B2

(12) United States Patent
Shimoda et al.

(10) Patent No.: US 11,460,826 B2
(45) Date of Patent: Oct. 4, 2022

(54) SERVO MOTOR CONTROLLER

(71) Applicant: FANUC CORPORATION, Yamanashi (JP)

(72) Inventors: Takaki Shimoda, Yamanashi (JP); Satoshi Ikai, Yamanashi (JP); Yuuki Shirakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 187 days.

(21) Appl. No.: 16/920,146

(22) Filed: Jul. 2, 2020

(65) Prior Publication Data
US 2021/0003989 A1 Jan. 7, 2021

(30) Foreign Application Priority Data
Jul. 5, 2019 (JP) .............................. JP2019-125731

(51) Int. Cl.
*G05B 19/402* (2006.01)

(52) U.S. Cl.
CPC .. G05B 19/402 (2013.01); *G05B 2219/33155* (2013.01)

(58) Field of Classification Search
CPC .................... G05B 19/402; G05B 2219/33155
See application file for complete search history.

(56) References Cited

U.S. PATENT DOCUMENTS

| 2014/0055067 A1* | 2/2014 | Kuroda | H02P 29/032 |
| | | | 318/400.32 |
| 2016/0041010 A1* | 2/2016 | Hara | G01D 5/244 |
| | | | 324/207.13 |
| 2016/0061635 A1* | 3/2016 | Liu | G01D 5/243 |
| | | | 702/151 |

FOREIGN PATENT DOCUMENTS

| JP | H05-282046 A | 10/1993 |
| JP | H09-105644 A | 4/1997 |
| JP | 2008-022590 A | 1/2008 |

* cited by examiner

*Primary Examiner* — Zoheb S Imtiaz
(74) *Attorney, Agent, or Firm* — Studebaker & Brackett PC

(57) ABSTRACT

To provide a servo motor controller allowing to eliminate the risk of abnormal driving in a servo motor caused due to the inability to detect abnormality prior to establishment of absolute position. A device is configured to control a servo motor of an industrial machine. The device includes a position detection part configured to detect a position of the servo motor, a magnetic pole detection part configured to detect a magnetic pole position of the servo motor, and a pole position calculation part configured to, at least in initial calculation, obtain the magnetic pole position detected by the magnetic pole detection part as an initial magnetic pole position, prior to establishment of absolute position, and in the following calculation, incrementally obtain the magnetic pole position on the basis of data of the position detected by the position detection part and a magnetic pole interval of the motor.

6 Claims, 4 Drawing Sheets

SERVO MOTOR CONTROLLER

This application is based on and claims the benefit of priority from Japanese Patent Application No. 2019-125731, filed on 5 Jul. 2019, the content of which is incorporated herein by reference.

BACKGROUND OF THE INVENTION

Field of the Invention

The present invention relates to a servo motor controller.

Related Art

A servo motor of an industrial machine, for example, a servo motor for driving a spindle of a machine tool, is subjected to driving control in rotation amount, speed, torque, and the like. A servo motor controller controls driving of a motor, by detecting a motor position and a magnetic pole position (phase (angle) of motor magnet) by a detector, and determining a voltage command value on the basis of various types of feedback values obtained from the detector, and applying the voltage modulated by PWM (pulse width modulation) method.

For example, in the case where an absolute position is known, abnormality occurring in an incremental encoder is detected by comparing the magnetic pole position calculated from the absolute position and the magnetic pole position detected by a magnetic pole detector.

Patent Document 1 discloses "a servo motor monitoring device included in a servo motor controller configured to control a servo motor on the basis of a current position detected by position detection means attached to the servo motor, including magnetic pole position calculation means configured to extract a magnetic pole position signal of the servo motor from a motor driving line connected to the servo motor, current position signal input means configured to input a current position signal received from the position detection means attached to the servo motor, and monitoring means configured to compare operation of the servo motor based on signals in two systems of the magnetic pole position signal and the current position signal of the servo motor, and output a stop command signal to stop power supply to the servo motor, when the operation of the two is detected not to be matched.

Patent Document 2 discloses "a failure detection method for a position detection circuit of an AC servo motor having an incremental encoder, including the steps of counting position data from a position detection signal of the incremental encoder, estimating a current magnetic pole position on the basis of the counted position data, reference position data and reference magnetic pole position data stored in advance, a number of magnetic poles of the AC servo motor, and a number of encoder pulses of the incremental encoder, comparing the estimated current magnetic pole position and current magnetic pole position data acquired from a magnetic pole signal of the incremental encoder, and determining occurrence of malfunction in the position detection circuit when a positional difference does not fall within a predetermined allowable range.

Patent Document 3 discloses "a control method for an AC servo motor having a position detector, including the steps of determining that a control function operates normally when an origin position signal of the position detector is output only in a vicinity of an origin point of count data for recognition of a magnetic pole position, and determining that the control function operates abnormally when the origin position signal is output at time of data output not in the vicinity of the origin point."

Patent Document 1: Japanese Unexamined Patent Application, Publication No. 2008-022590
Patent Document 2: Japanese Unexamined Patent Application, Publication No. H09-105644
Patent Document 3: Japanese Unexamined Patent Application, Publication No. H05-282046

SUMMARY OF THE INVENTION

In the case where an incremental encoder is used as a detector, since the relation at the time of power-up between the absolute coordinate of a machine and the position signal of the encoder is unknown, the establishment of absolute position allowing to establish the relation therebetween is required. The establishment of absolute position is realized, for example, by origin return operation based on the Z-phase signal of the incremental encoder.

As described above, abnormality occurring in the incremental encoder is detectable, in the prior art, by calculating the magnetic pole position on the basis of the absolute position obtained by the establishment of absolute value, and by comparing the calculated magnetic pole position and the magnetic pole position obtained by the magnetic pole detector.

However, even by such an abnormality detection method for an incremental encoder (Patent Document 1, Patent Document 2, Patent Document 3), abnormality occurring in the incremental encoder is not detectable prior to the establishment of absolute position. That is, since the absolute position is unknown in the stage after power-up and prior to the establishment of absolute position allowing to establish the absolute position (origin return), abnormality occurring in the detector is not able to be checked by the above-described abnormality detection method for the incremental encoder. Thus, in the case where a detector signal has abnormality, the servo motor may not be driven properly.

Therefore, a technique to perform abnormality check to a detector prior to establishment of absolute position has been strongly desired.

A servo motor controller in one aspect of the present disclosure is configured to control a servo motor of an industrial machine. The servo motor controller includes a position detection part configured to detect a position of the servo motor, a magnetic pole detection part configured to detect a magnetic pole position of the servo motor, and a pole position calculation part configured to, at least in initial calculation, obtain the magnetic pole position detected by the magnetic pole detection part as an initial magnetic pole position, prior to establishment of absolute position, and in following calculation, incrementally obtain the magnetic pole position on the basis of data of the position detected by the position detection part and a magnetic pole interval of the motor.

The servo motor controller in one aspect of the present disclosure is capable of performing abnormality check to the position detection part and the magnetic pole detection part (detector) prior to the establishment of absolute position, such as by comparing the value of the difference between the magnetic pole positions respectively obtained by the magnetic pole detection part and by the pole position calculation part, or the differential value of the difference, with a predetermined threshold, and determining presence or absence of abnormality in the position detection part or the magnetic pole detection part.

Accordingly, the servo motor controller in one aspect of the present disclosure is capable of eliminating the risk of abnormal driving in the servo motor caused due to the inability to detect abnormality prior to the establishment of absolute position as in the prior art.

DETAILED DESCRIPTION OF THE INVENTION

A servo motor controller according to one embodiment will be described below by referring to FIG. 1 to FIG. 5.

The description below of the present embodiment is based on the assumption that a machine tool serves as an industrial machine, and that the servo motor controller controls driving such as of a spindle of the machine tool. It is noted that the servo motor controller according to the present invention may be used to control driving of a servo motor used in other industrial machines, not limited to a machine tool, for example, robot, conveying machine, measuring instrument, test equipment, pressing machine, press-fitting machine, printing machine, die casting machine, injection molding machine, food machine, packaging machine, welding machine, washing machine, coating machine, assembling device, mounting machine, woodworking machine, sealing machine, and cutting machine.

Figure 1:
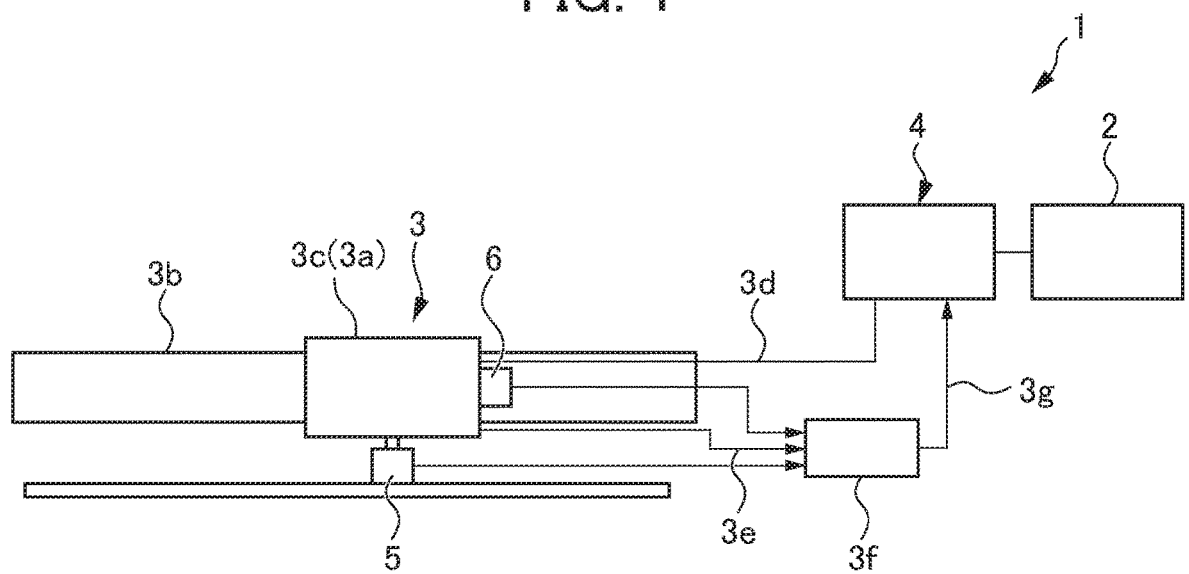
FIG. 1 is a diagram illustrating one example of a servo motor (linear motor) controller in one aspect of the present disclosure.

As shown in FIG. 1, a control system 1 for a machine tool (industrial machine) of the present embodiment includes, for example, a CNC (computerized numerical control) 2 serving as a command part, a servo motor controller (control part, servo amplifier) 4 configured to control driving of a servo motor (drive part) 3 of the machine tool on the basis of a command from the CNC 2.

Figure 2:
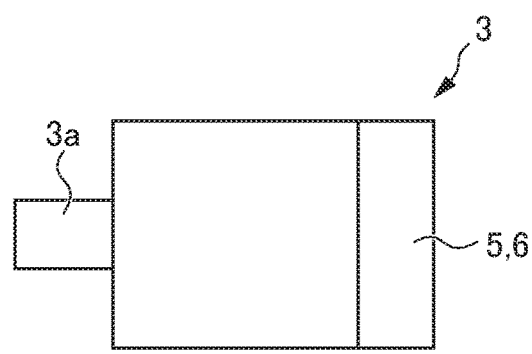
FIG. 2 is a diagram illustrating one example of a servo motor (rotary motor) controller in one aspect of the present disclosure.
Figure 3:
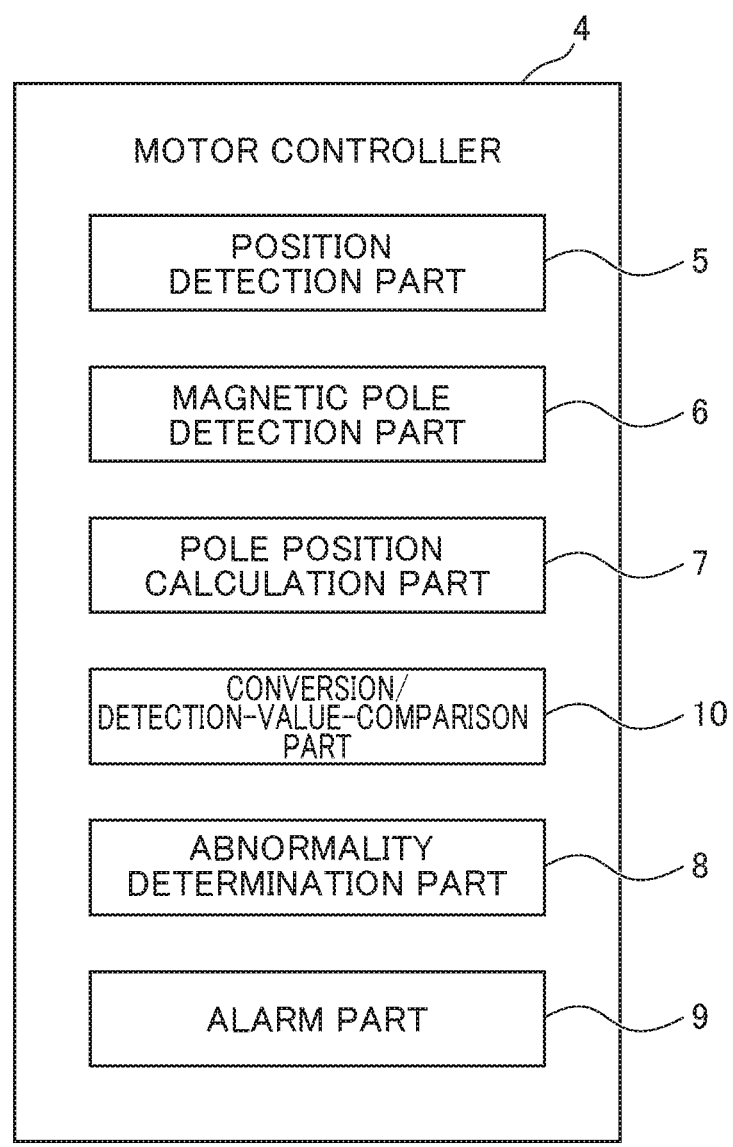
FIG. 3 is a block diagram illustrating the servo motor controller in one aspect of the present disclosure.

As shown in FIG. 1 and FIG. 3 (and FIG. 2), the servo motor controller 4 of the present embodiment includes an incremental type position detection part (position detector/ FIG. 1: linear encoder, FIG. 2: encoder) 5 configured to detect a position such as of an axis 3a of the servo motor 3, a magnetic pole detection part (magnetic detector) 6 configured to detect a magnetic pole position of the servo motor 3, a pole position calculation part 7 configured to, at least in the initial calculation, use the magnetic pole position detected by the magnetic pole detection part 6 as the initial magnetic pole position prior to the establishment of absolute position, and in the following calculation, incrementally calculate the magnetic pole position, on the basis of the position data detected by the position detection part 5 and the magnetic pole interval of the motor, and an abnormality determination part 8 configured to determine presence or absence of abnormality in the position detection part 5 or the magnetic pole detection part 6, by comparing the value of the difference between the magnetic pole positions respectively obtained by the magnetic pole detection part 6 and by the pole position calculation part 7, or the differential value of the difference above (difference in speed), with a predetermined threshold set in advance.

The servo motor controller 4 of the present embodiment further includes an alarm part 9 configured to, when the abnormality determination part 8 determines the presence of abnormality, generate an alarm in response to the determination result, and stop the servo motor 3, and a conversion/ detection-value-comparison part 10 configured to convert a command value of a position of the servo motor 3 output by the CNC 2 to a command value of an exciting phase (motor position, magnetic pole position), and compare the converted command value with the detection values detected by the position detection part 5 and the magnetic pole detection part 6.

It is noted that the meanings of "establishment of absolute position," "magnetic pole position" and "magnetic pole detection part (magnetic pole detector) 6" are described below.

The term of "establishment of absolute position" means to establish the relation at the time of power-up between the absolute coordinate of the machine and the position signal of the encoder because the relation at the time of power-up is unknown. The establishment of absolute position is executed by the origin return operation based on the Z-phase signal of the encoder.

The term of "magnetic pole position" means a phase (angle) of a motor magnet. The angle of 360° leads to one turn starting from N pole through S pole to N pole.

The "magnetic pole detector" is a device for generating an electrical signal matched with a phase of a motor magnet. In an example, in the case where the position and the magnetic pole position are both detected by an encoder, some magnetic detectors are configured to generate the signal of the magnetic pole position corresponding to a certain angle previously set on the basis of the relation between the position and the magnetic pole position (refer to FIG. 2), and some magnetic detectors are configured to directly measure a magnetic field, such as by a hall sensor.

In the servo motor controller 4 of the present embodiment, for example, in the case where the servo motor 3 is a linear motor (3) having a magnet pole 3b and a coil slider 3c as shown in FIG. 1, the coil slider 3c is configured with a linear encoder (position detection part 5) and a magnetic pole detector (magnetic pole detection part 6), while in the case where the servo motor 3 is a rotary motor (3) as shown in FIG. 2, the servo motor 3 includes an encoder (detector (5, 6)) for detecting a position and a magnetic pole position of the rotary axis 3a. It is noted that, in FIG. 1, a power line is denoted by a reference numeral 3d; a thermostat line is denoted by a reference numeral 3e; a position detection circuit is denoted by a reference numeral 3f; and an FSSB (optical fiber cable for connection) is denoted by a reference numeral 3g.

In order to check consistency (presence or absence of abnormality) of a detector of the position detection part 5 and/or the magnetic pole detection part 6 by use of the servo motor controller 4 of the present embodiment, an exciting phase is monitored.

The pole position calculation part 7 uses, at least in the initial calculation, the magnetic pole position detected by the magnetic pole detection part 6 as the initial magnetic pole position prior to the establishment of absolute position, and in the following calculation, incrementally calculates the magnetic pole position, on the basis of the position data detected by the position detection part 5 and the magnetic pole interval of the servo motor.

Figure 4:
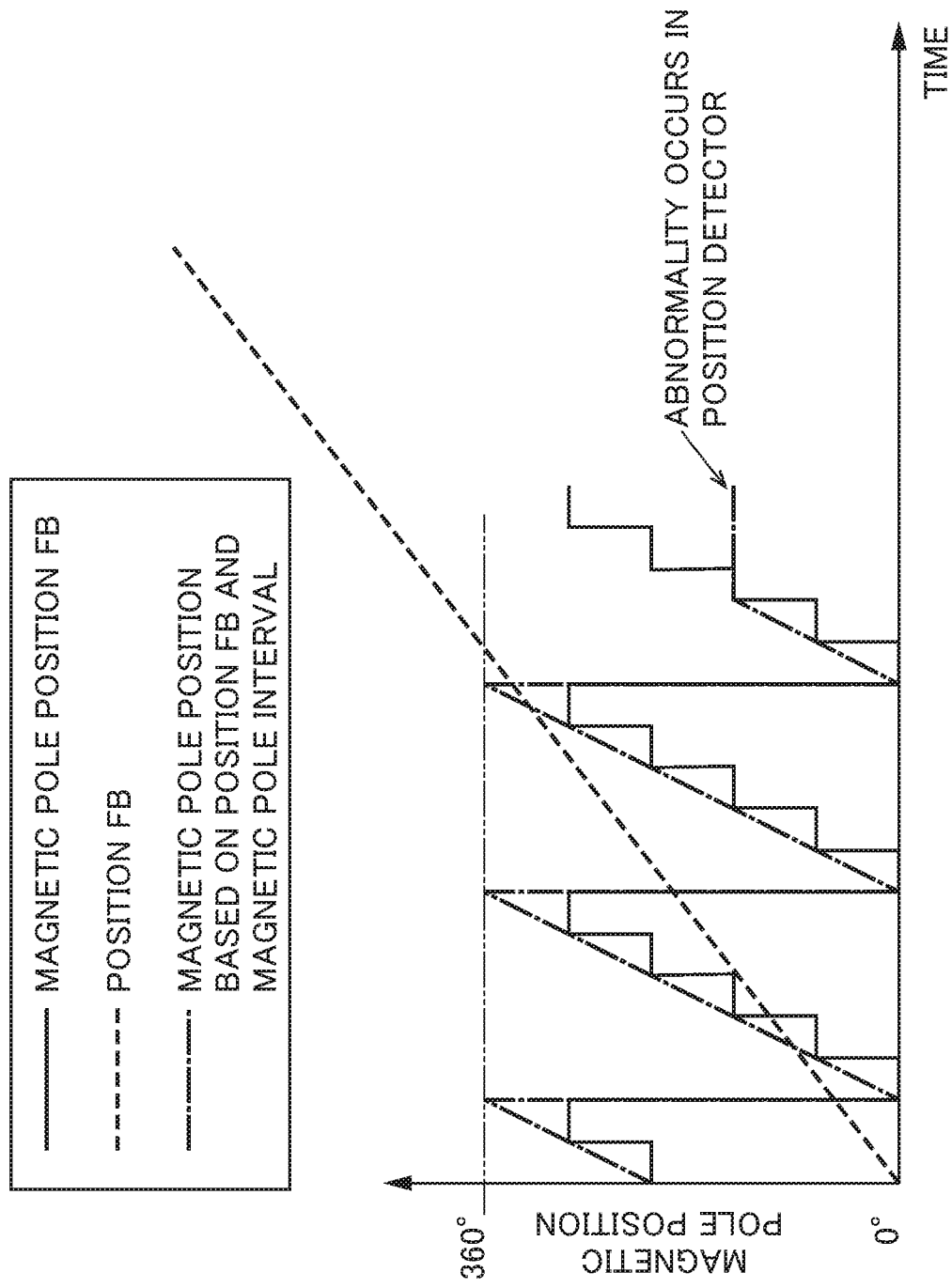
FIG. 4 is a diagram for describing an abnormality detection method for a position detection part (or a magnetic pole detection part) by using the servo motor controller in one aspect of the present disclosure.

FIG. 4 is a graph indicating the relation between time and magnetic pole position. Each of the solid lines indicates a feedback value of a magnetic pole phase (detection value: magnetic pole position FB); the dashed line indicates a feedback value of a phase of the motor (detection value: motor position FB); and each of the one-dot dashed lines indicates a magnetic pole position calculated on the basis of the motor position FB and the magnetic pole interval of the motor.

As shown in FIG. 4, in the case where each of the position detection part 5 and the magnetic pole detection part 6 is in a normal state, the phase (motor position) obtained on the basis of the position data is matched with the phase obtained on the basis of the magnetic pole position data.

For example, in the case where the position detection part 5 malfunctions, and where the feedback therefrom is not obtained, the phases are not matched with each other (refer to the right part in FIG. 4). The abnormality determination part 8 is capable of detecting the state, and thereby determining the occurrence of abnormality. The alarm part 9 generates an alarm in response to the occurrence of abnormality, and stops driving of the servo motor 3 and notifies an operator of the occurrence of abnormality.

If, as in the prior art, the servo motor controller 4 includes an incremental encoder as the position detection part 5, so as to obtain only the phase based on the data from the magnetic pole detection part 6 prior to the establishment of absolute position, the servo motor controller 4 is not capable of obtaining an exciting phase because the positional relation with the magnet is not obtained only on the basis of the position data.

The servo motor controller 4 of the present embodiment, which includes the magnetic pole detection part 6 configured to detect the magnetic pole position, is configured to detect the initial position of the magnet on the basis of the data of the magnetic pole detection part 6 at the time of power-up prior to the establishment of absolute position.

After the establishment of absolute position, the pole position calculation part 7 is switched to the mode of calculating the magnetic pole position on the basis of the absolute position obtained by the position detection part 5, and therefor generates a phase on the basis of the scale data of the position detection part 5 in the same manner as in the prior art.

Figure 5:
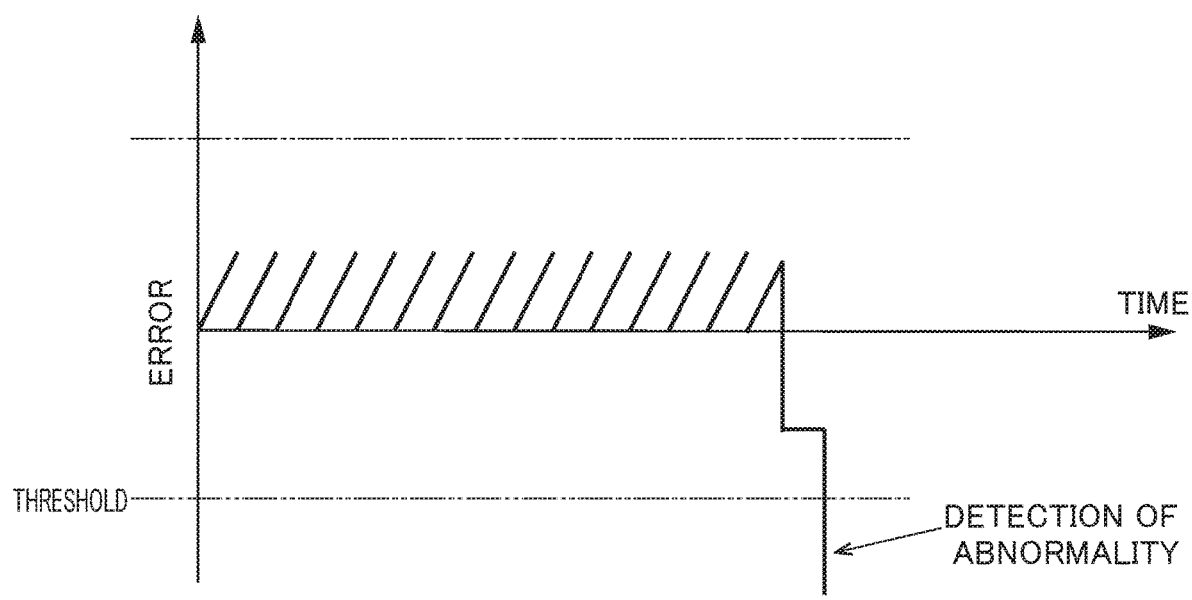
FIG. 5 is another diagram for describing the abnormality detection method of the position detection part (or the magnetic pole detection part) by using the servo motor controller in one aspect of the present disclosure.

As shown in FIG. 4 and FIG. 5, the abnormality determination part 8 of the present embodiment determines presence or absence of abnormality in the position detection part 5 or the magnetic pole detection part 6, by comparing the value of the difference between the magnetic pole positions respectively obtained by the magnetic pole detection part 6 and by the pole position calculation part 7, or the differential value of the difference above, with a predetermined threshold. For example, in the case of the occurrence of the phase difference by 90°, the abnormality determination part 8 determines the occurrence of abnormality. At this time, the abnormality determination part 8 shall determine the occurrence of abnormality in the case where the value of the difference between the magnetic pole positions respectively obtained by the magnetic pole detection part 6 and by the pole position calculation part 7, or the differential value of the difference above is kept exceeding a predetermined threshold.

Accordingly, in the servo motor controller 4 of the present embodiment, which is configured with the magnetic pole detector in addition to the incremental type position detection part 5, the pole position calculation part 7 uses, at least in the initial calculation, the magnetic pole position detected by the magnetic pole detection part 6 as the initial magnetic pole position, prior to the establishment of absolute position, and in the following calculation, incrementally calculates the magnetic pole position on the basis of the position data detected by the position detection part 5 and the magnetic pole interval of the motor, and the value of the difference between the magnetic pole positions respectively obtained by the magnetic pole detection part 6 and by the pole position calculation part 7, or the differential value of the difference above is compared with a predetermined threshold, thereby enabling to perform abnormality check to the position detection part 5 and the magnetic pole detection part 6 prior to the establishment of absolute position.

Accordingly, the servo motor controller 4 of the present embodiment is able to eliminate the risk of abnormal driving in the servo motor 3 caused due to the inability to detect the abnormality prior to the establishment of absolute position as in the prior art.

Further, in the servo motor controller 4 of the present embodiment, after the establishment of absolute position, the pole position calculation part 7 is switched to the mode of calculating the magnetic pole position on the basis of the absolute position obtained by the position detection part 5, and therefor generates a phase on the basis of the scale data of the position detection part 5 in the same manner as in the prior art, thereby enabling to perform abnormality check.

In the servo motor controller 4 of the present embodiment, the abnormality determination part 8 determines the occurrence of abnormality in the case where the value of the difference between the magnetic pole positions respectively obtained by the magnetic pole detection part 6 and by the pole position calculation part 7, or the differential value of the difference above is kept exceeding a predetermined threshold, thereby enabling to perform precise and reliable abnormality check to the position detection part 5 and the magnetic pole detection part 6, without erroneous determination.

In the servo motor controller 4 of the present embodiment, which includes the alarm part 9, in the case where the abnormality determination part 8 determines the occurrence of abnormality, the alarm part 9 generates an alarm in response to the result of the determination, and stops the servo motor 3, thereby enabling to prevent unexpected dangerous operation in the machine tool (industrial machine), and further enabling to promptly inform an operator of the abnormality.

In the present embodiment, the conversion/detection-value-comparison part 10 converts the command value of the position such as of the axis 3*a* of the servo motor 3 output by the CNC 2 to a command value of an exciting phase (motor position, magnetic pole position), and compares the converted command value and the detection values detected by the position detection part 5 and the magnetic pole detection part 6.

This allows to discriminate whether the abnormality occurs in the position detection part 5 or in the magnetic pole detection part 6, by utilizing difference in resolution between the position detection part 5 and the magnetic pole detection part 6 (resolution: position detection part 5>magnetic pole detection part 6). The servo motor controller 4, which includes the conversion/detection-value-comparison part 10, is further capable of utilizing the precision in position detection by the position detection part 5. This allows the machine tool to precisely control machining, as an example. It is noted that, in this case, the servo motor controller 4 may not necessarily include the abnormality determination part 8.

Although one embodiment of the servo motor controller has been described so far, the present invention may include appropriate modifications in the range without departing from the gist of the present invention, not limited to the above-described embodiment.

EXPLANATION OF REFERENCE NUMERALS

1 CONTROL SYSTEM FOR MACHINE TOOL (INDUSTRIAL MACHINE)
2 CNC
3 SERVO MOTOR
3A AXIS
4 SERVO MOTOR CONTROLLER
5 POSITION DETECTION PART
6 MAGNETIC POLE DETECTION PART
7 POLE POSITION CALCULATION PART
8 ABNORMALITY DETERMINATION PART
9 ALARM PART
10 CONVERSION/DETECTION-VALUE-COMPARISON PART

What is claimed is:

1. A servo motor controller configured to control a servo motor of an industrial machine, the servo motor controller comprising:
    a position detection part configured to detect a position of the servo motor;
    a magnetic pole detection part configured to detect a magnetic pole position of the servo motor; and
    a pole position calculation part configured to, at least in initial calculation, define the magnetic pole position detected by the magnetic pole detection part as an initial magnetic pole position, prior to establishment of absolute position, and in following calculation, incrementally calculate a displacement amount of the magnetic pole position from the initial magnetic pole position on a basis of data of the position detected by the position detection part and a magnetic pole interval of the motor to obtain a calculation-based magnetic pole position.

2. The servo motor controller according to claim 1, the servo motor controller further comprising:
    an abnormality determination part configured to determine presence or absence of abnormality in the position detection part or the magnetic pole detection part, by comparing a value of difference between the magnetic pole positions obtained by the magnetic pole detection part and the calculation-based magnetic pole position calculated by the pole position calculation part, or a differential value of the difference, with a predetermined threshold.

3. The servo motor controller according to claim 1, wherein
    after the establishment of absolute position, the pole position calculation part is switched to a mode of calculating the magnetic pole position on a basis of the absolute position obtained by the position detection part.

4. The servo motor controller according to claim 2, wherein
    the abnormality determination part determines the presence of abnormality when the difference or the differential value of the difference is kept exceeding the predetermined threshold.

5. The servo motor controller according to claim 2, the servo motor controller further comprising:
    an alarm part configured to, when the abnormality determination part determines the presence of abnormality, generate an alarm in response to the determination, and stop the servo motor.

6. The servo motor controller according to claim 1, the servo motor controller further comprising:
    a conversion/detection-value-comparison part configured to convert a command value of the position of the servo motor to a command value of an exciting phase, and compare the converted command value with a detection value of each of the position detection part and the magnetic pole detection part.

* * * * *